(12) United States Patent
Ono (10) Patent No.: US 8,064,323 B2
(45) Date of Patent: Nov. 22, 2011

(54) ELECTRO-OPTICAL DEVICE AND ELECTRONIC APPARATUS

(75) Inventor: Takehiro Ono, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1527 days.

(21) Appl. No.: 11/457,860

(22) Filed: Jul. 17, 2006

(65) Prior Publication Data

US 2007/0046846 A1 Mar. 1, 2007

(30) Foreign Application Priority Data

Sep. 1, 2005 (JP) .................................. 2005-253124

(51) Int. Cl.
*G02F 1/136* (2006.01)
(52) U.S. Cl. ......................................... 369/126; 349/42
(58) Field of Classification Search .................. 369/126; 349/113, 38, 155, 42
See application file for complete search history.

(56) References Cited

U.S. PATENT DOCUMENTS

2004/0218120 A1* 11/2004 Ikeno et al. ................... 349/113
2006/0215068 A1* 9/2006 Nakagawa ..................... 349/38

FOREIGN PATENT DOCUMENTS

JP         A 10-177190          6/1998

* cited by examiner

*Primary Examiner* — Hoa T Nguyen
*Assistant Examiner* — Kim-Kwok Chu
(74) *Attorney, Agent, or Firm* — Oliff & Berridge PLC (57) ABSTRACT

An electro-optical device includes: a substrate; first films each of which is formed on the substrate and has an edge formed in at least a part thereof; a first insulating film that is laminated on the first films; second films that are laminated on the first insulating film; a second insulating film that is laminated on the second films; and contact holes each of which is formed in the second insulating film above the edge to pass through the second insulating film. In the electro-optical device, the contact hole is formed at a position apart from the edge by a distance equal to or larger than the thickness of the first insulating film in plan view.

11 Claims, 5 Drawing Sheets

ELECTRO-OPTICAL DEVICE AND ELECTRONIC APPARATUS

BACKGROUND

1. Technical Field

The present invention relates to an electro-optical device and an electronic apparatus having a substrate in which a plurality of step portions are formed in a lower layer and contact hole are formed in a plurality of upper layers so as to electrically connect the plurality of upper layers.

2. Related Art

In general, an electro-optical device, for example, a liquid crystal device includes two substrates formed of, for example, glass or quartz that are opposite to each other and a liquid crystal layer interposed between the two substrates. On one of the substrates, a plurality of pixel electrodes and a plurality of switching elements, for example, thin film transistors (hereinafter, referred to as TFTs) are disposed in a matrix, and a counter electrode is formed on the other substrate. Image display is performed by changing the optical characteristics of the liquid crystal layer interposed between the two substrates according to image signals.

That is, image signals are supplied to the plurality of pixel electrodes (ITO; indium tin oxide) disposed In a matrix through the switching elements such as TFTs. A voltage is applied to the liquid crystal layer between the pixel electrodes and the counter electrode on the basis of the image signals, thereby changing the alignment of the liquid crystal molecules. The change in the alignment of the liquid crystal molecules causes a change in the transmittance of each pixel, thereby changing the transmittance of light passing through the pixel electrodes and the liquid crystal layer on the basis of the image signals. In this way, image display is performed.

The TFTs are turned on by supplying scanning signals to gate electrodes through scanning lines. Then, the image signals supplied to source regions of semiconductor films through data lines are supplied to the pixel electrodes through the TFTs in the on state, thereby performing image display.

The source regions of the semiconductor films and the data lines are connected to each other through contact holes. More specifically, an interlayer insulating film is laminated on the semiconductor film. The contact hole is formed in the interlayer insulating film above the source region to pass through the interlayer insulating film. The data line is laminated on the interlayer insulating film while burying the contact hole. The source region of the semiconductor film is electrically connected to the data line through the contact hole.

The contact hole for electrically connecting the source region of the semiconductor film to the data line is generally formed in each of the plurality of pixel electrodes and the plurality of TFTs. For example, JP-A-10-177193 discloses a technique in which semiconductor films of adjacent TFTs are connected to each other by a common source region, that is, one source region is shared by adjacent TFTs. In this case, the shared source region of the semiconductor film and a data line are connected to each other by a common contact hole, that is, one contact hole.

In the technique disclosed in JP-A-10-177190, the common contact hole is formed above two adjacent edges of scanning lines formed for every pair of adjacent pixel electrodes.

More specifically, scanning lines are formed on a substrate formed of, for example, quartz, and the scanning line is patterned for every pixel. A first interlayer insulating film is formed on the scanning lines, and a semiconductor film is laminated on the first interlayer insulating film. Then, source regions are formed in parts of the semiconductor film positioned above spaces between the edges of the scanning lines, for examples by implanting a dopant.

At this time, the parts of the first Interlayer insulating film and the source regions positioned above the spaces between the edges of the scanning lines have the same shape as that between the edges of the scanning lines. Therefore, the first interlayer insulating film and the source region each have two edges. As a result, weak inclined surfaces are formed in the vicinities of the two edges of each of the first interlayer insulating film and the source region.

Then, a second interlayer insulating film is formed on the semiconductor film. Parts of the second interlayer insulating film positioned above the spaces between the edges of the scanning lines also have a shape corresponding to the shape between the edges of the scanning lines. Finally, contact holes are formed In the parts of the second interlayer insulating film positioned above the spaces between the edges of the scanning lines, that is, on the edges of the source regions to pass through the second interlayer insulating film.

Since the contact holes are formed on the spaces between the edges of the source regions, the weak inclined surfaces in the vicinities of the edges of the source regions can be damaged after the contact holes are formed.

As a result, the electrical connection between the source regions and the data lines are broken after the data lines are formed on the second interlayer insulating film, which causes image signals transmitted through the data lines not to be supplied to the pixel electrodes.

SUMMARY

An advantage of some aspects of the invention is that it provides an electro-optical device and an electronic apparatus capable of reliably preventing electrical connection between layers from being broken due to contact holes each of which is formed above between edges of a lower layer in order to electrically connect the layers.

According to a first aspect of the invention, an electro-optical device includes: a substrate; first films each of which is formed on the substrate and has an edge formed in at least a part thereof; a first insulating film that is laminated on the first films; second films that are laminated on the first insulating film; a second insulating film that is laminated on the second films; and contact holes each of which is formed in the second insulating film above the edge to pass through the second insulating film. In the electro-optical device, the contact hole is formed at a position apart from the edge by a distance equal to or larger than the thickness of the first insulating film in plan view.

In the electro-optical device according to the first aspect of the invention, when the contact holes are formed in the second insulating film above the edges formed in the first film to pass through the second insulating film, each of the contact holes is formed at a position apart from the edges by a distance equal to or larger than the thickness of the first insulating film in plan view. Therefore, the contact hole is formed on the flat surface aside from inclined surfaces that are weak portions of the second film formed due to the edges formed in the first film. In other words, the contact hole is not formed on the weak portions of the second film. For this reason, the second film is not damaged due to the formation of the contact hole. Therefore, the electrical connection between the second film and a third film laminated on the second film through the contract hole can be reliably prevented from being broken due to the formation of the contact hole.

According to a second aspect of the invention, an electro-optical device includes: a substrate; first films each of which is formed on the substrate and has two adjacent edges formed in at least a part thereof; a first insulating film that is laminated on the first films; second films that are laminated on the first insulating film; a second insulating film that is laminated on the second films; and contact hole each of which is formed in the second insulating film above the two edges to pass through the second insulating film. In the electro-optical device, the contact hole is formed at a position apart from the two edges by a distance equal to or larger than the thickness of the first insulating film in plan view.

In the electro-optical device according to the second aspect of the invention, the contact hole is formed on a flat surface of the second film apart from inclined surfaces of the second film that are weak portions formed due to the two edges of the first film but. In other words, the contact hole is not formed on the weak portions of the second film. For this reason, the second film is not damaged due to the formation of the contact hole. Therefore, the electrical connection between the second film and a third film laminated on the second film through the contract hole can be reliably prevented from being broken due to the formation of the contact hole.

According to a third aspect of the invention, an electro-optical device includes: a substrate; first films each of which is formed on the substrate and has two adjacent edges formed in at least a part thereof; a first insulating film that is laminated on the first films; second films that are laminated on the first insulating film; a second insulating film that is laminated on the second films; and contact holes each of which is formed in the second insulating film above the two edges to pass through the second insulating film. In the electro-optical device, the contact hole is disposed to extend over the two adjacent edges in plan view.

In the electro-optical device according to the third aspect of the invention, when the contact hole is formed in the second insulating film above the edges of the first film to pass through the second insulating film, the contact hole is formed to extend over the two edges in plan view. Therefore, even though, after forming the contact hole, the inclined surfaces, which are weak portions formed in the second film due to the two edges, are damaged, the damaged portions of the inclined surfaces in the second film are electrically connected to each other through a third film laminated on the second film. As a result, the electrical connection between the second film and the third film laminated on the second film through the contract hole can be reliably prevented from being broken due to the formation of the contact hole.

According to the first to third aspects, the electro-optical device may further include: a first substrate having a display region where a plurality pixel electrodes and a plurality of switching elements corresponding to the pixels electrodes are formed; a second substrate disposed so to be opposite to the first substrate; and an electro-optical material interposed between the first and second substrates. In this structure, it is preferable that the substrate be the first substrate.

According to the above-mentioned structure, the liquid crystal device includes a first substrate having a display region where a plurality pixel electrodes and a plurality of switching elements corresponding to the pixels electrodes are formed; a second substrate disposed to be opposite to the first substrate; and an electro-optical material interposed between the first and second substrates. Therefore, the electrical connection between the conductive second film formed on the first substrate and a conductive third film laminated on the second film through the contract hole can be reliably prevented from being broken due to the formation of the contact hole.

Further, in the above-mentioned embodiments, preferably, the plurality of pixel electrodes and the plurality of switching elements are provided on the first substrate, and the first film is composed of scanning lines through which signals for turning on or off the plurality of switching elements are supplied and which are provided for the plurality of pixel electrodes.

In the above-mentioned aspects, the two edges may be edges of adjacent scanning lines provided for every pixel electrode.

In the above-mentioned aspect, preferably, the second film is a semiconductor film forming the switching element.

In the above-mentioned aspect, preferably, the contact hole electrically connects a source region of the semiconductor film to a data line for supplying an image signal to the pixel electrode formed on the second insulating film.

According to the first to the third aspects of the invention, the contact hole is formed on the flat surface aside from inclined surfaces that are weak portions of the second film formed due to the edges formed in the first film. In other words, the contact hole is not formed on the weak portions of the second film. For this reason, the second film is not damaged by the formation of the contact hole. Therefore, the electrical connection between the source region of the semiconductor film and the data line laminated the source region of the semiconductor film by the contact hole can be reliably prevented from being broken. Further, even though, after forming the contact hole, the inclined surfaces, which are weak portions of the semiconductor film, are damaged by the contact hole, the damaged portions of the inclined surfaces in the source region of the semiconductor film are electrically connected to each other through the data line laminated on the semiconductor film by the contact hole. Therefore, the electrical connection between the source region of the semiconductor film and the data line is not broken. As a result, it is possible to reliably provide image signals to the neighboring electrodes through the data line and the source region of the semiconductor film.

Further, in the electro-optical device according to one of the first and third aspects of the invention, preferably, the semiconductor films of two switching elements of provided to adjacent pixel electrodes are connected to each other in the source region, and the source region and the data line are electrically connected to each other by one contact hole.

According to the first to third aspects, it is possible to reduce the size of the pixel electrode. Therefore, when one common contact hole shared by the source regions of the neighboring semiconductor films in order to reduce the size of the pixel electrode, it is possible to prevent the electrical connection between the source regions of the semiconductor films and the data lines from being broken, and to reliably supply image signals to the pixel electrodes through the data lines and the source regions of the semiconductor films.

According to a fourth aspect of the invention, an electronic apparatus includes an electro-optical device having: a substrate; first films each of which is formed on the substrate and has an edge formed in at least a part thereof; a first insulating film that is laminated on the first films; second films that are laminated on the first insulating film; a second insulating film that is laminated on the second films; and contact holes each of which is formed in the second insulating film above the edge to pass through the second insulating film. In the electronic apparatus, the contact hole is formed at a position apart from the edge by a distance equal to or larger than the thickness of the first insulating film in plan view.

According to a fifth aspect of the invention, an electronic apparatus includes an electro-optical device having: a substrate; first films each of which is formed on the substrate and has two adjacent edges formed in at least a part thereof; a first insulating film that is laminated on the first films; second films that are laminated on the first insulating film; a second insulating film that is laminated on the second films; and contact hole each of which is formed in the second insulating film above the two edges to pass through the second insulating film. In the electronic apparatus, the contact hole is formed at a position apart from the two edges by a distance equal to or larger than the thickness of the first insulating film in plan view.

According to a sixth aspect of the invention, an electronic apparatus includes an electro-optical device having: a substrate; first films each of which is formed on the substrate and has two adjacent edges formed in at least a part thereof; a first insulating film that is laminated on the first films; second films that are laminated on the first insulating film; a second insulating film that is laminated on the second films; and contact holes each of which is formed in the second insulating film above the two edges to pass through the second insulating film. In the electronic apparatus, the contact hole is disposed to extend over the two adjacent edges in plan view.

According to the above-mentioned aspect, the electronic apparatus includes an electro-optical device having the substrate that can prevent the electrical connection between the conductive second film and a conductive third film laminated on the second film through the contact hole from being broken. Therefore, it is possible to provide an electronic apparatus with a high reliability.

BRIEF DESCRIPTION OF THE DRAWINGS

The invention will be described with reference to the accompanying drawings, wherein like numbers refer to like elements.

DESCRIPTION OF EXEMPLARY EMBODIMENTS

Hereinafter, embodiments of the invention will be described with reference to the accompanying drawings. In embodiments of the invention, as an example of an electro-optical device, a liquid crystal device will be described. The liquid crystal device includes an element substrate (first substrate) having switch elements, for example, thin film transistors (hereinafter, referred to as TFTs) formed thereon and a counter substrate (second substrate) disposed to be opposite to the element substrate.

First Embodiment

Figure 1:
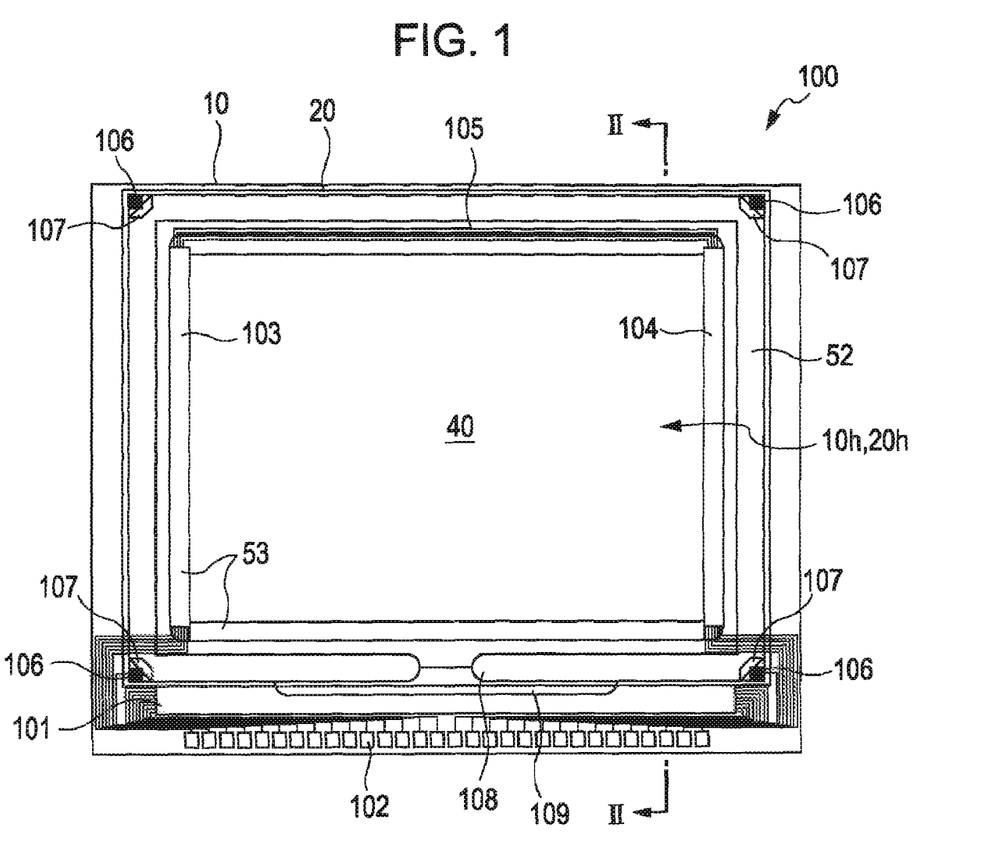
FIG. 1 is a plan view of a liquid crystal display according to the first embodiment of the invention having various components as seen from a counter substrate side.
Figure 2:
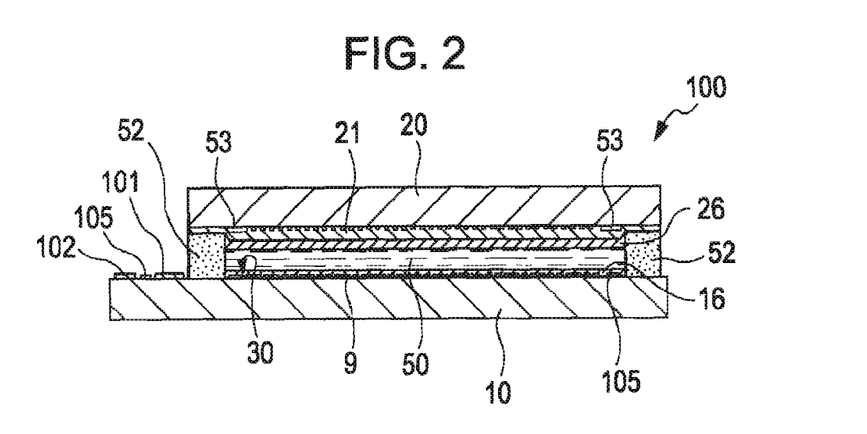
FIG. 2 is a cross-sectional view taken along the line II-II of FIG. 1.
Figure 3:
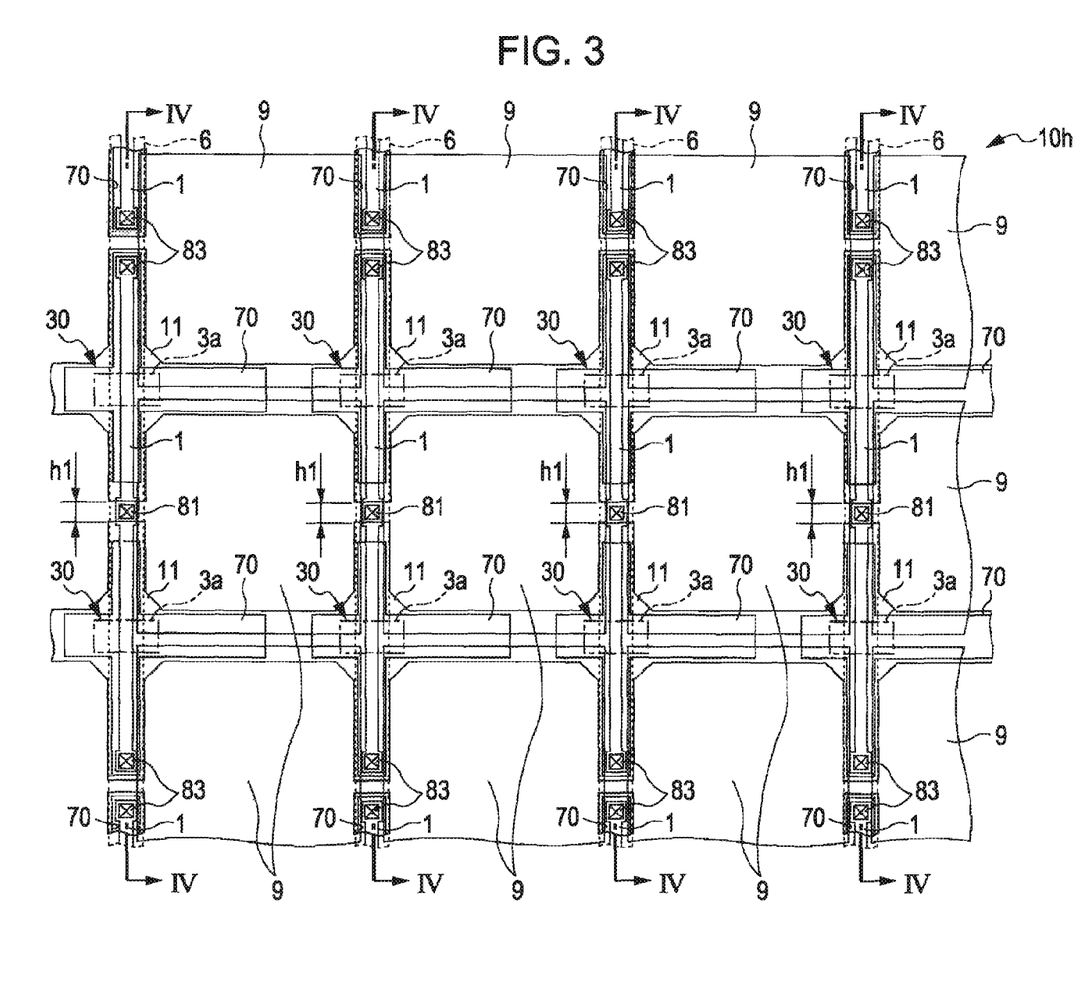
FIG. 3 is a schematic plan view partially showing a forming pattern of each of layers in a plurality of adjacent pixels formed on a TFT substrate of the liquid crystal device of FIG. 1.
Figure 4:
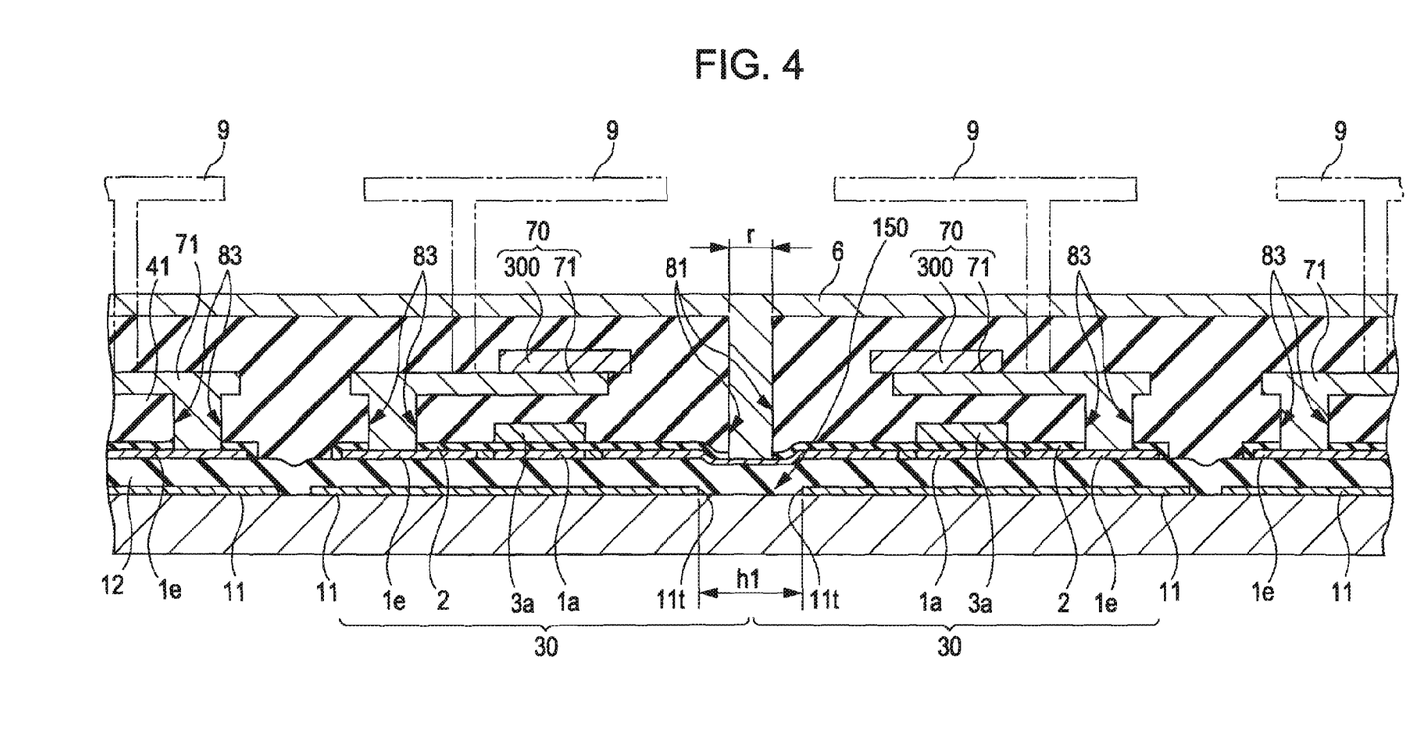
FIG. 4 is a cross-sectional view taken along the line IV-IV of FIG. 3.
Figure 5:
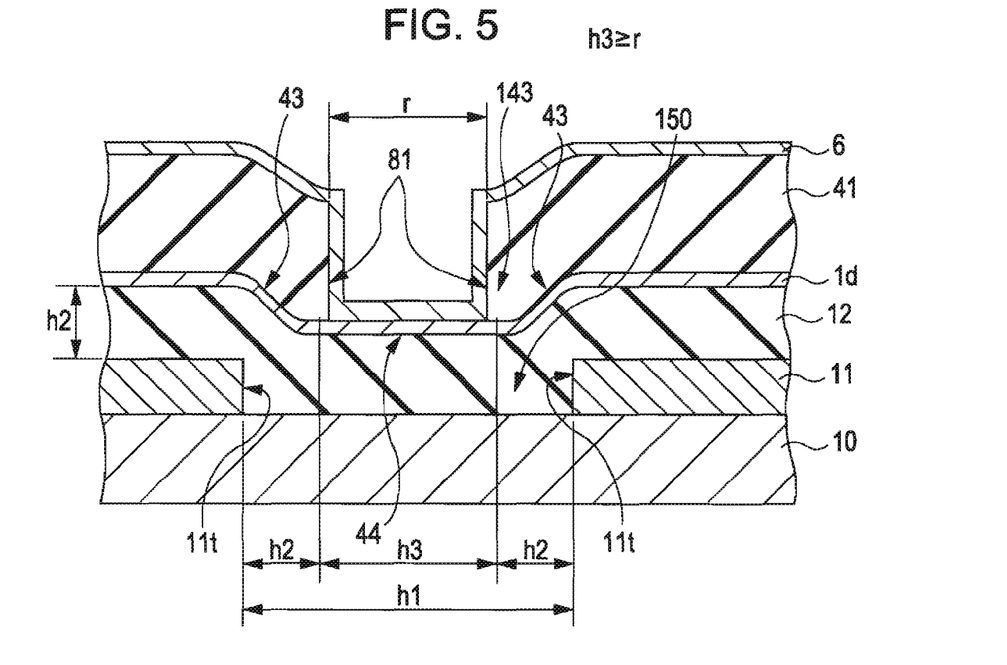
FIG. 5 is an enlarged sectional view showing the construction of the vicinity of a contact hole electrically connecting a data line to a source region of a semiconductor film of FIG. 4.

First, the construction of a liquid crystal device according to a first embodiment will be described. FIG. 1 is a plan view of a liquid crystal display having various components formed thereon according to the first embodiment of the invention, as seen from a counter substrate side. FIG. 2 is a cross-sectional view taken along the line II-II of FIG. 1. FIG. 3 is a partial plan view schematically showing a pattern of each of layers in a plurality of adjacent pixels formed on a TFT substrate of the liquid crystal device of FIG. 1. FIG. 4 is a cross-sectional view taken along the line IV-IV of FIG. 3. FIG. 5 is a partial enlarged sectional view showing the construction of the vicinity of a contact hole electrically connecting a data line to a source region of a semiconductor film of FIG. 4.

As shown in FIGS. 1 and 2, a liquid crystal device 100 includes an element substrate 10 (hereinafter, referred to as a TFT substrate), a counter substrate 20 disposed so as to be opposite to the TFT substrate 10, and liquid crystal 50 (electro-optical material) interposed between the TFT substrate 10 and the counter substrate 20. The TFT substrate 10 is formed of, for example, quartz, glass, or silicon; and the counter substrate 20 is formed of, for example, glass or quartz. The TFT substrate 10 and the counter substrate 20 are bonded to each other by a sealing material 52.

On a surface of the TFT substrate 10 facing the liquid crystal 50, a display region 10h of the TFT substrate 10 forming a display region 40 of the liquid crystal device 100 is formed. In the display region 10h, for example, a plurality of pixel electrodes (ITO) 9 and a plurality of switching elements (hereinafter, referred to as TFTs 30) are disposed in a matrix.

More specifically, as shown in FIG. 3, in the display region 10h, a plurality of scanning lines 11 (gate lines) and a plurality of data lines 6 (source lines) are disposed so as to intersect each other. The plurality of pixel electrodes 9 are disposed in a matrix in regions divided by the scanning lines 11 and the data lines 6.

The data line 6 has a laminated structure including, for examples an aluminum film, and the scanning line 11 is formed of, for example, tungsten silicide (w-si). The scanning line 11 is electrically connected by a member (not shown) to a gate electrode 3a of the TFT 30 opposite to a channel region 1a of a semiconductor film 1 (see FIG. 4).

In other words, in each of the intersections of the scanning lines 11 and the data lines 6, the channel region 1a is disposed so as to be opposite to the gate electrode 3a connected to the scanning line 11, and the TFT 30 for pixel switching is formed.

When the TFT 30 is turned on by an ON signal from the scanning line 11, an image signal supplied to the data line 6 is supplied to the pixel electrode 9. In this case, in order to prevent burn-in of a display image, inversion driving is performed to invert the polarity of a driving voltage applied to each pixel electrode 9, for example, for every field of the image signal. The voltage between the pixel electrode 9 and a common electrode 21 (to be described below) provided on the counter substrate 20 is applied to the liquid crystal 50.

Further, a plurality of storage capacitors 70 (see FIG. 4) are provided in parallel to the pixel electrodes 9. The storage capacitor 70 can retain the voltage of the pixel electrode 9, for example, for a period that is three orders of magnitude longer than a period for which the source voltage is applied. The storage capacitor 70 makes it possible to improve an electric charge retaining property and to display images having a high contrast ratio.

On the entire surface of the counter substrate 20, the common electrode (ITO) 21 is provided. On a surface of the common electrode 21 that faces the liquid crystal 50 and is opposite to the display region 10h of the TFT substrate 10, a display region 20h of the counter substrate 20 forming the display region 40 of the liquid crystal device 100 is formed.

On the pixel electrodes 9 of the TFT substrate 10, a first alignment film 16 on which a rubbing process has been performed is provided. Also, on the common electrode 21 formed on the entire surface of the counter substrate 20, a second alignment film 26 on which the rubbing process has been performed is provided. The first and second alignment films 16 and 26 are formed of a transparent organic material such as polyimide.

On the counter substrate 20, light-shielding films 53 are provided as a frame that defines the display region by defining and dividing the peripheries of the display region 10h of the TFT substrate 10 and the display region 20h of the counter substrate 20 in pixel regions.

That is, the display regions 10h and 20h are regions of the pixel regions of the TFT substrate 10 and the counter substrate 20 that are not covered by the light-shielding film 53. The sealing material 52 is applied to bond the TFT substrate 10 and the counter substrate 20.

When the liquid crystal 50 is injected in a space between the TFT substrate 10 and the counter substrate 20 by a known liquid crystal injecting manner, the sealing material 52 is applied excluding a part of one side of one of the substrates. The part where the sealing material 52 is not applied is a liquid crystal injecting opening 108 for injecting the liquid crystal 50 between the TFT substrate 10 and the counter substrate 20 bonded to each other.

The liquid crystal injecting opening 108 is sealed by a sealant 109 after the liquid crystal is injected. When the liquid crystal 50 is injected between the TFT substrate 10 and the counter substrate 20 in a liquid crystal dropping method, the liquid crystal injecting opening 108 is unnecessary in the sealing material 52, and thus the sealing material 52 is continuously applied to at least one of the substrates along the periphery.

In the outer region of the sealing material 52, a data line driving circuit 101 and an external connecting terminal 102 for connection to an external circuit are provided along one side of the TFT substrate 10. The data line driving circuit 101 supplies the image signals to the data lines (not shown) of the TFT substrate 10 at a predetermined timing to drive the data lines.

Further, on the TFT substrate 10, scanning line driving circuits 103 and 104 are provided along two sides adjacent to the one side. The scanning line driving circuits 103 and 104 respectively formed at positions opposite to the light-shielding films 53 on the inner side of the sealing material 52 on the TFT substrate 10. The scanning line driving circuits 103 and 104 supply scanning signals to the gate electrodes 3a and the scanning lines 11 of the TFT substrate 10 at predetermined timings to drive the gate electrodes 3a.

Furthermore, on the TFT substrate 10, a plurality of wiring lines 105 are provided to be opposite to three sides of each of the light-shielding films 53. The wiring lines 105 connect the data line driving circuit 101, the scanning line driving circuits 103 and 104, the external connecting terminal 102, and four vertical connection terminals 107.

The vertical connection terminals 107 are formed at four corners of the sealing 52 on the TFT substrate 10. Further, vertical connection members 106 are provided between the TFT substrate 10 and the counter substrate 20. The upper ends of the vertical connection members 106 are in contact with the vertical connection terminals 107, and the lower ends thereof are in contact with the common electrode 21, thereby electrically connecting the TFT substrate 10 and the counter substrate 20.

In addition, on the TFT substrate 10, a laminated structure of various components including the TFTs 30 and the pixel electrodes 9 is formed, as shown in FIG. 4. The laminated structure is well known, and thus will be briefly described.

On the TFT substrate 10, as a first layer, the scanning lines 11 are formed of, for example, an elemental metal, an alloy, metal silicide, poly silicide including at least one of high melting metals, such as Ti, Cr, W, Ta, and Mo, a laminate thereof, or conductive polysilicon.

Each of the scanning lines 11 is separately formed one-by-one for every pixel electrode 9 vertically neighboring in FIG. 3 by patterning. Therefore, a lower-layer step portion 150 is formed to have a space of a length hi at the boundary between two edges 11t of a separate portion in each scanning line 11, as shown in FIG. 4. The step portion 150 has a step difference from the adjacent edges 11t of the scanning line 11 provided for each pixel electrode 9, as shown in FIG. 5.

The scanning lines 11 have a function of simultaneously controlling the ON/OFF states of the TFTs 30 existing in the same row. The scanning lines 11 also have a function of shielding light incident on the TFTs 30 from the lower side, since the scanning lines 11 are formed to almost bury regions where the pixel electrodes 9 are not formed, as shown in FIG. 3. In other words, the scanning lines 11 have a light-shielding function. As a result, the generation of a leakage current in the semiconductor film 1 of the TFT 30 is prevented, which makes it possible to display high-quality images without flicker.

As a second layer, the TFTs 30 including the semiconductor films 1 are laminated on the scanning lines 11 with a base insulating film 12 (to be described below) interposed therebetween. In other words, the semiconductor films 1 are laminated on the base insulating films 12. The semiconductor films 1 have a thickness of about 30 to 150 nm, preferably, about 35 to 150 nm.

The TFT 30 has an LDD (lightly doped drain) structure, and includes, as main parts, the semiconductor film 1, the semiconductor gate electrode 3a, and a gate insulating film 2 insulating the gate electrode 3a from the semiconductor film 1. The semiconductor film 1 is formed of, for example, polysilicon, and a channel is formed in the semiconductor film 1 by an electrical field from the gate electrode 3a.

The semiconductor film 1 has a channel region 1a, a source region 1d, and a drain region 1e. In this embodiment, in order to reduce the size of the pixel electrode 9, the source region 1d is connected between the pixel electrode 9 and the TFT 30 adjacent to each other in the longitudinal direction. In other words, the source region is common to the pixel electrode 9 and the TFT 30 adjacent to each other in the longitudinal direction. For this reason, the source region 1d will now be referred to as a common source region 1d.

On the upper side of the step portion 150 of the scanning line 11 of the common source region 1d of the semiconductor film 1, a step portion 143 having two edges is formed due to the step portion 150, as shown in FIG. 5. The step portion 143 has inclined surfaces 43 formed due to the thickness (30 to 150 nm) of the adjacent scanning lines 11 at the edge 11t and a flat surface 44 formed due to the space having the length h1 between the scanning lines 11. The inclined surfaces 43 are weak portions of the common source region 1d.

The base insulating film 12 is composed of, for example, a silicon oxide film as a first insulating film with a thickness h2 on the scanning lines 11 and under the TFTs 30. The thickness h2 is, for example, in the range of about 500 to 2000 nm.

The base insulating film 12 has a function of insulating the scanning lines 11 from the TFTs 30. Further, since the base insulating film 12 is formed on the entire surface of the TFT substrate 10, it has a function of preventing the characteristics of the TFTs 30 from varying due to the roughness which is generated when the surface of the TFT substrate 10 is polished or contaminants which remain after the cleaning.

Contact holes (not shown) are formed in the base insulating film 12 to electrically connect the scanning lines 11 to the gate electrodes 3a of the TFTs 30 Further, step portions each having two edges are formed due to the step portions 150 of the scanning lines 11 at the positions of the base insulating film 12 corresponding to the step portions 150, as shown in FIG. 5.

The storage capacitor 70 is formed on the TFT 30 including the semiconductor film 1 with an interlayer insulating film 41 (to be described below) interposed therebetween. The storage capacitor 70 remarkably improves the potential retaining property of the pixel electrode 9 as described above.

As shown in FIG. 4, the storage capacitor 70 includes a lower electrode 71 that serves as a pixel-potential-side capacitor electrode and is connected to the drain region 1e of the TFT 30 and the pixel electrode 9a; a capacitor electrode 300 serving as a fixed-potential-side capacitor electrode; and a dielectric film (not shown) interposed between the lower electrode 71 and the capacitor electrode 300.

On the TFT 30 including the semiconductor film 1, the Interlayer insulating film 41 is formed of, for example, silicon nitride or silicon oxide as a second insulating film. The interlayer insulating film 41 insulates the TFTs 30 from the storage capacitors 70. Further, step portions each having two edges are formed due to the step portions 150 of the scanning lines 11 at the positions of the interlayer insulating film 41 corresponding to the step portions 150, as shovel in FIG. 5.

In the interlayer insulating film 41, contact holes 83 for electrically connecting the drain regions 1e of the semiconductor films 1 to the data lines 6, which will be described below, are formed to pass through the interlayer insulating film 41. Further, the drain regions 1e of the semiconductor films 1 are connected to the storage capacitors 70 and the pixel electrodes 9 by a plurality of contact holes other than the contact holes 83.

Further, contact holes 81 are formed at the positions of the interlayer insulating film 41 corresponding to the step portions 150 of the scanning lines 11 to electrically connect the data lines 6 and the common source regions 1d of the semiconductor films 1 that are common to the pixel electrodes 9 and the TFTs 30 neighboring. In other words, each of the contact holes 81 is formed to be common to adjacent pixel electrodes 9.

The diameter 'r' of each contact hole 81 is equal to or smaller than the length h3 of a space that is apart from the edges 11t of adjacent scanning lines 11 by the thickness h2 of the base insulating film 12 in the space having the length h1 of the step portion 150 in plan view (h3≧r), as shown in FIG. 5. In other words, tie contact hole 81 is formed on the flat surface 44 of the common source region 1d of the semiconductor film 1.

On the interlayer insulating film 41, the data lines 6 are formed. The data lines 6 have a three-layered structure of an aluminum layer, a titanium nitride layer, and a silicon nitride layer in the order from the bottom. Further, the data lines 6 are electrically connected to the common source regions 1d of the semiconductor films 1 by the contact holes 81.

On the data lines 6, as described above, the pixel electrodes 9 are formed in a matrix with a plurality of layers interposed therebetween, and the alignment film 16 is formed on the pixel electrodes 9. Further, step portions are formed due to the step portions 150 at the positions of the data lines 6 corresponding to the step portions 150 of the scanning lines 11, as shown in FIG. 5.

The liquid crystal device 100 has the above-mentioned construction, but is not limited thereto.

Figure 6:
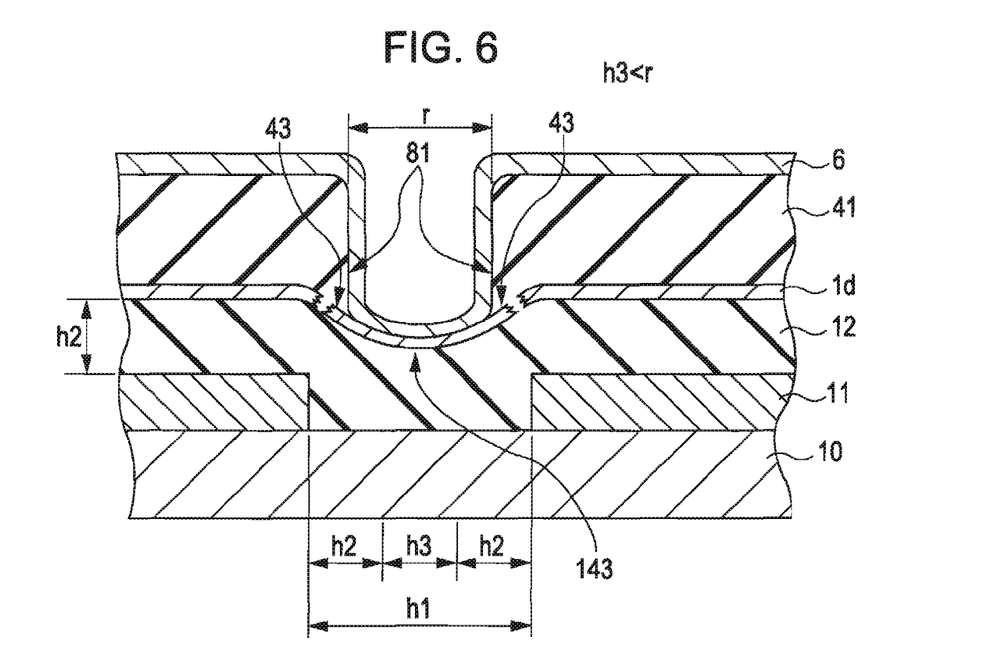
FIG. 6 is a cross-sectional view showing the construction of the vicinity of a contact hole for electrically connecting a source region of a semiconductor film and a data line according to the related art.

Next, the effects of this embodiment will be described with reference to FIGS. 3 to 6. FIG. 6 is a cross-sectional view showing the construction of the vicinity of a contact hole for electrically connecting a source region of a semiconductor film and a data line according to the related art.

First, a TFT substrate 10 made of, for example, quartz, glass, or silicon is prepared. On the entire surface of the TFT substrate 10, a metal film formed of a metallic material, such as Ti, Cr, W, Ta, or Mo, or a metal alloy, such as metal silicide, is formed with a thickness of about 100 to 500 nm, preferably, about 200 nm by a sputtering method.

The metal film is then patterned by a photolithographic method or an etching method, thereby forming the scanning lines 11 having strip shapes in plan view. The scanning line 11 is patterned to form step portions 150 between every two pixel electrodes 9 vertically neighboring in FIG. 3. The step portion 150 is formed to have the space of the length h1 and two edges 11t, as shown in FIGS. 3 and 4.

Next, on the scanning lines 11, the base insulating film 12 is formed of NSG (non-doped silicon glass), silicon nitride, silicon oxide, or the like by a normal-pressure or reduced-pressure CVD method using TEOS gas with a thickness of h2. The thickness h2 of the base insulating film 12 is set in the range of about 500 to 2000 nm.

Subsequently, the semiconductor films 1 are laminated. That is, first, an amorphous silicon (a-Si) film is formed on the base insulating film 12 by the reduced-pressure CVD method (at a pressure of about 20 to 40 Pa) using monosilane gas or disilane gas at a flow rate of about 400 to 600 cc/min at a temperature of about 450° C. to 550° C., and more preferably, at a temperature of about 500° C. Then, the amorphous silicon film is patterned by the photolithographic method or the etching method, thereby forming the semiconductor films 1 having a predetermined pattern.

On each of the semiconductor films 1, an insulating film 2 (including the gate insulating film) composed of a single-layered or multi-layered high temperature silicon oxide film (HTO film) or silicon nitride film is formed. On the insulating film 2, a polysilicon film is deposited by the reduced-pressure CVD method, and phosphor (P) is thermally diffused in the polysilicon film to make the polysilicon film conductive. The conductive polysilicon film is patterned by the photolithographic method or the etching method, thereby forming the gate electrodes 3a including gate electrode portions of the TFTs 30 in a predetermined pattern.

Next, the interlayer insulating film 41 is laminated. The thickness of the interlayer insulating film 41 is set in the range of about 500 to 2000 nm. The interlayer insulating film 41 is etched by a dry etching method, such as a reactive ion etching method or a reactive ion beam etching method, thereby forming the contact holes 81 and 83 to pass through the interlayer insulating film 41.

In this case, the contact holes 81 are formed to pass through the common source regions 1d of the semiconductor films 1, and the contact holes 83 are formed to pass through the drain regions 1e. Further, the contact holes 81 are formed above the step portions 150 of the scanning lines 11 in the Interlayer insulating film 41.

Furthermore, the contact hole 81 is formed such that the diameter r of the contact hole 81 is equal to or smaller than the length h3 of a space that is apart from the edges 11t of adjacent scanning lines 11 by the thickness h2 of the base insulating film 12 in the space having the length h1 of the step portion 150 in plan view (h3≧r), as shown in FIG. 5. In other words, the contact hole 81 is not formed on the inclined surfaces 43, which are weak portions of the common source region 1d of the semiconductor film 1, but is formed on the flat surface 44. Therefore, a stress generated when the contact hole 81 is formed is not applied to the inclined surfaces 43.

As described above, a stress generated when the contact hole 81 is formed is not applied to the inclined surfaces 43 of the common source region 1d, and thus the inclined surfaces 43 are not damaged, unlike the relate art in which the contact hole 81 is formed in the interlayer insulating film 41 such that the diameter r is larger than the length h3 (r>h3).

Finally, on the interlayer insulating film 41, the data lines 6 are formed in a predetermined pattern. The data lines 6 are electrically connected to the common source regions 1d of the semiconductor films 1 through the contact holes 81.

The other layers are formed by known methods, and thus a description thereof will be omitted. In this way, the TFT substrate 10 is completed. The method of manufacturing a liquid crystal device has been described above, but the invention is not limited thereto. The liquid crystal device may be manufactured by various methods.

As described above, in this embodiment, the contact holes 81 are formed in the interlayer insulating film 41 of the TFT substrate 10 above the step portions 150 of the scanning lines 11 to electrically connect the common source regions 1d of the semiconductor films 1 to the data lines 6.

Further, the contact hole 81 is formed such that the diameter r of the contact hole 81 is equal to or smaller than the length h3 of a space that is apart from the edges 11t of adjacent scanning lines 11 by the thickness h2 of the base insulating film 12 in the space having the length h1 of the step portion 150 in plan view (h3≧r) as shovel in FIG. 5.

In this embodiment, the contact hole 81 is formed on the flat surface 44 aside from the inclined surfaces 43, which are weak portions of the step portion 143, formed in the common source region 1d due to the step portion 150 of the scanning lines 11, particularly, due to the thickness of adjacent scanning lines 11 at the edges 11t. In other words, the contact hole 81 is not formed on the inclined surfaces 43. Therefore, the stress generated when the contact hole 81 is formed is prevented from damaging the inclined surfaces 43 of the common source region 1d, as shown in FIG. 6.

With the above-mentioned construction, even though the contact hole 81 is formed above the step portion 150 of the scanning line 11, it is possible to reliably prevent the electrical connection between the common source region 1d of the semiconductor film 1 and the data line 6 laminated on the common source region 1d from being broken.

Further, it is possible to reliably supply image signals to the adjacent pixel electrodes 9 through the data lines 6 and the common source regions 1d of the semiconductor films 1.

Second Embodiment

Figure 7:
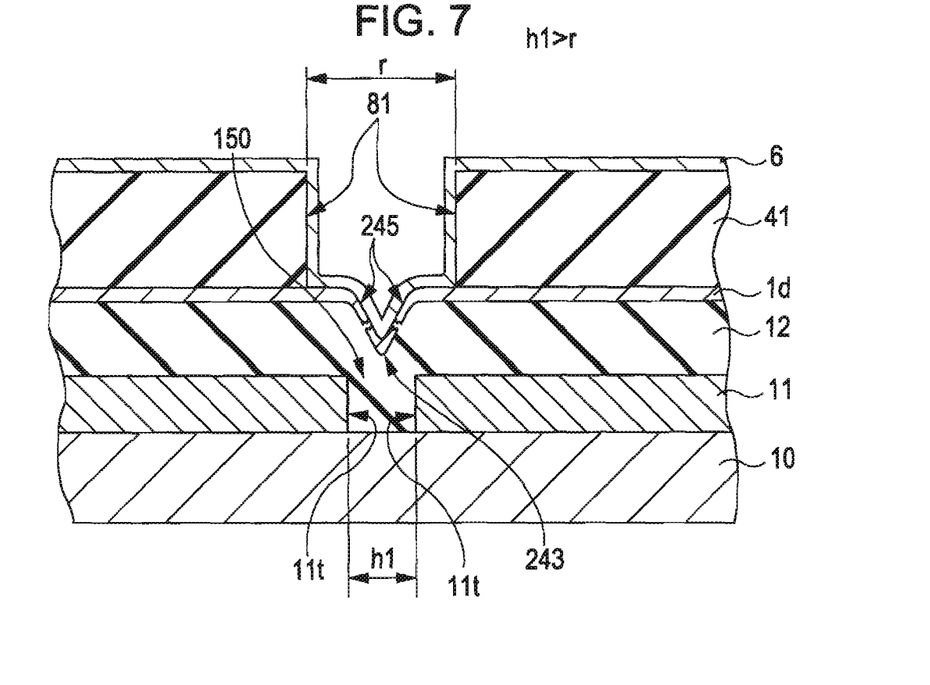
FIG. 7 is an enlarged cross-sectional view showing the construction of the vicinity of a contact hole for electrically connecting a common source region of a semiconductor film of a TFT substrate in a liquid crystal device according to a second embodiment of the invention.

FIG. 7 is a partial enlarged cross-sectional view showing the construction of the vicinity of a contact hole for electrically connecting a data line and a common source region of a semiconductor film of a TFT substrate in a liquid crystal device according to a second embodiment of the invention.

The second embodiment is similar to the first embodiment except that the diameter r of the contact hole 81 that is formed in the interlayer insulating film 41 to electrically connect the common source region 1d of the semiconductor film 1 to the data line 6 is larger than the length h1 of the space in the step portion 150 of the scanning line 11. Only the difference will be described. In the second embodiment, the same components as those of the first embodiment are denoted by the same reference numerals, and a description thereof will be omitted.

As shown in FIG. 7, on the base insulating film 12, the common source region 1d of the semiconductor film 1 is laminated. At this time, a step portion 243 is formed due to the step portion 150 in a part of the common source region 1d of the semiconductor film 1 above the step portion 150 of the scanning line 11.

The step portion 243 has inclined surfaces 245 due to the thickness (30 to 150 nm) of adjacent scanning lines 11 at the edges 11t. The inclined surfaces 245 are weak portions in the common source region 1d.

On the common source region 1d of the semiconductor film 1, the interlayer insulating film 41 is laminated. In the interlayer insulating film 41, the contact holes 81 are formed above the step portions 150 of the scanning lines 11 so as to electrically connect the gate lines 6 to the common source regions 1d of the semiconductor films 1 common to the pixel electrodes 9 and the TFTs 30 adjacent to each other.

The diameter r of the contact hole 81 is set to be larger than the length h1 of the space in the step portion 150 (h1<r). In other words, the contact hole 81 is formed to extend over the two edges 11t in the step portion 150 of the scanning line 11 in plan view.

Next, the effects of this embodiment having the above-mentioned construction will be described.

In the Interlayer insulating film 41, the contact hole 81 formed above the step portion 150 of the scanning line 11 such that the diameter r of the contact hole 81 is larger than the length h1 of the space in the step portion 150 (h1<r).

With this construction, the stress generated when the contact hole 81 is formed applied to the inclined surfaces 245 of the step portion 243 of the common source region 1d. As a result, the inclined surfaces 245 may be damaged. However, when the data line 6 is laminated on the common source region 1d with the contact hole 81 interposed therebetween, the damaged portions of the inclined surfaces 245 of the common source region 1d are electrically connected to each other through the data line 6.

As described above, in this embodiment, the contact holes 81 are formed in the interlayer insulating film 41 of the TFT substrate 10 above the step portions 150 of the scanning lines 11 so as to electrically connect the common source regions 1d of the semiconductor films 1 to the data lines 6. Further, the contact hole 81 is formed such that the diameter r of the contact hole 81 is larger than the length h1 of the space in the step portion 150 (h1<r).

With this construction, even though the inclined surfaces 245, which are weak portions in the common source region 1d, are damaged by the stress generated when the contact hole 81 is formed, the damaged portions of the inclined surfaces 245 in the common source region 1d are electrically connected to each other through the data line 6 laminated on the common source region 1d by the contact hole 81.

For this reason, even though the contact hole 81 is formed above the step portion 150 of the scanning line 11, the electrical connection between the common source region Id of the semiconductor film 1 and the data line 6 is not broken. As a result, it is possible to reliably supply image signals to the adjacent pixel electrodes 9 through the common source region 1*d* of the semiconductor film and the data line 6.

Hereinafter, modifications will be described.

In the first and second embodiments, the contact holes 81 are formed in the interlayer insulating film 41 above the step portions 150 of the scanning lines 11 so as to electrically connect the common source regions 1*d* and the data lines 6. The formation of the contact holes 81 prevents the electrical connection between the common sources id and the data lines 6 from being broken.

The invention is not limited to the first and second embodiments. As long as step portions are formed in a lower layer and contact holes are formed in an upper layer so as to electrically connect various layers of the upper layer, even though the first and second embodiments are applied to form contact holes in any layer, the formation of the contact holes prevents the electrical connection between the layers from being broken, as in the first and second embodiments.

In the first and second embodiments, the source region 1*d* is common to the pixel electrode 9 and the TFT 30 adjacent to each other in the longitudinal direction, but the invention is not limited thereto. For example, the source region 1*d* may be formed for each of the pixel electrode 9 and the TFT 30 on the TFT substrate.

Further, the step portion 150 have two edges 11*t* in the first and second embodiments, but the invention is not limited thereto. The step portion 150 may have one edge.

The invention is not limited to the above-mentioned exemplary embodiments, and can be appropriately modified within the scope or spirit of the Invention. For example, even though each of the liquid crystal devices according to the above-mentioned embodiments is an active-matrix-type liquid crystal display module using active elements such as TFTs, the invention can be applied to an-active matrix-type liquid crystal display module using active elements such as TFDs (thin film diodes).

Further, in the first and second embodiments, the liquid crystal device is used as an example of an electro-optical device, but the invention is not limited thereto. The invention can also be applied to electroluminescent devices, particularly, organic electroluminescent devices, inorganic electroluminescent devices, plasma display devices, FED field emission display) devices, SED (surface-conduction electron-emitter display) devices, LED (light-emitting diode) display devices, electrophoresis display devices, and devices that use compact TVs using thin Braun tubes, liquid crystal shutters.

Further, the invention can be applied to display devices, for example, LCOS (liquid crystal on silicon) devices in which elements are formed on a semiconductor substrate. In the LCOS device, a monocrystal silicon substrate is used as an element substrate and transistors are formed on the monocrystal silicon substrate as switching elements used for pixels or peripheral circuits. Further, each pixel uses a reflective pixel electrode, and various elements of the pixel are formed in the lower layer of the pixel electrode.

Furthermore, the invention can be applied to IPS (in-plane switching) display devices, in each of which a pair of electrodes is formed In the same layer of one substrate, or FFS (fringe field switching) display devices, in each of which a pair of electrodes is formed with an insulating film in one substrate.

Figure 8:
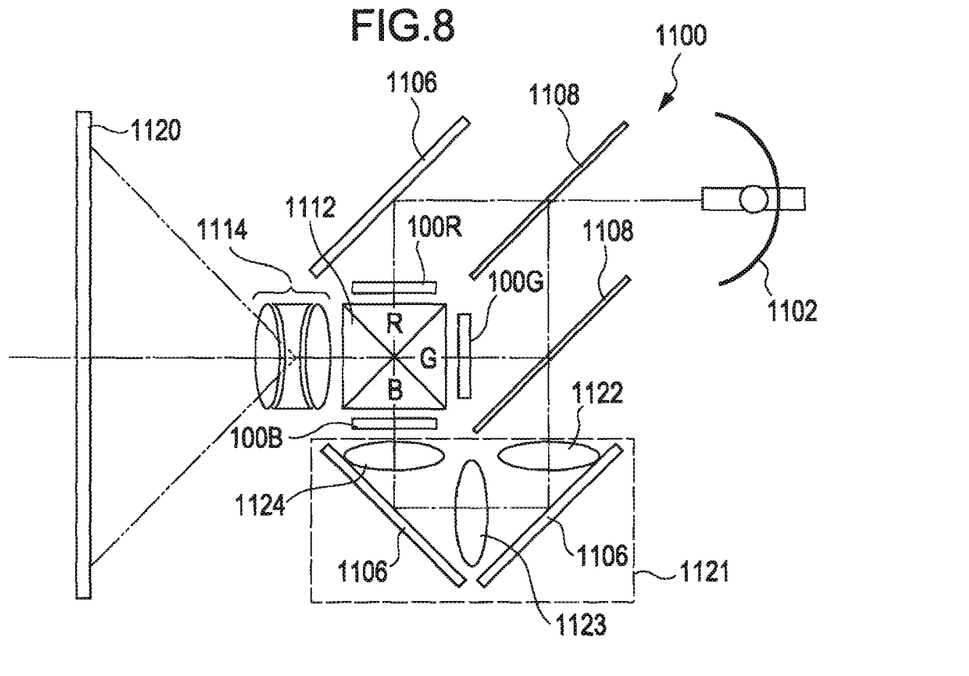
FIG. 8 is a view showing the construction of a projector provided with three liquid crystal devices of FIG. 1.

The liquid crystal device according to the invention can be applied to electronic apparatuses, such as projection display apparatuses, particularly, projectors. FIG. 8 is a view showing the construction of a projector provided with three liquid crystal devices of FIG. 1.

As shown in FIG. 8, a projector 1100 is provided with a plurality of liquid crystal devices 100, for example, three liquid crystal devices 100R, 100G, and 100B serving as R, G, and B light valves, respectively.

In the projector 1100, when a lamp unit 1102, such as a metal halide lamp, which is a white light source, emits projection light, the emitted light is divided into R, G, and B light components corresponding to the three primary colors of R, G, and B by three mirrors 1106 and two dichroic mirrors 1108. The R, G, and B light components are guided to the corresponding light valves 100R, 100G, and 100B.

In this case, in particular, the light component B is guided via a relay lens system 1121 composed of an incidence lens 1122, a relay lens 1123, and an emission lens 1124 in order to prevent the optical loss due to a long light path.

The R, G, and B light components corresponding to the three primary colors are modulated by the light valves 100R, 100G, and 100B. The modulated R, G, and B light components are combined by a dichroic prism 1112. The combined light is projected onto a screen 1120 through a projection lens 1114 as a color image.

The liquid crystal device according to the invention can be applied to various apparatuses, such as projection display apparatuses other than the above-mentioned projector, mobile telephones, portable information apparatuses or portable personal computers referred to as PDAs (personal digital assistants), personal computers, digital still cameras, vehicle-mounted monitors, digital video cameras, liquid crystal TV sets, view-finder-type and monitor-direct-view-type videotape recorders, car navigators, pagers, electronic organizers, calculators, word processors, workstations, video phones, and POS terminals.

What is claimed is:

1. An electro-optical device comprising:
    a first substrate having a display region where a plurality pixel electrodes and a plurality of switching elements corresponding to the pixels electrodes are formed;
    a second substrate disposed so to be opposite to the first substrate;
    an electro-optical material interposed between the first and second substrates;
    a plurality of first films each of which is formed on the first substrate and has an edge formed in at least a part of each of the plurality of first films
    a first insulating film that is laminated on the first films;
    second films that are laminated on the first insulating film;
    a second insulating film that is laminated on the second films; and
    contact holes each of which is formed in the second insulating film above the edge to pass through the second insulating film,
    wherein the contact hole is formed at a position apart from the edge by a distance equal to or larger than the thickness of the first insulating film in plan view,
    the plurality of pixel electrodes and the plurality of switching elements are provided on the first substrate, and
    the plurality of first films are composed of a plurality of scanning lines through which signals for turning on or off the plurality of switching elements are supplied and which are provided for the plurality of pixel electrodes.
2. The electro-optical device according to claim 1,
    wherein the two edges are edges of adjacent scanning lines provided for every pixel electrode.

3. The electro-optical device according to claim 1,
wherein the each of the second films is a semiconductor film forming the switching element.

4. The electro-optical device according to claim 3,
wherein the contact hole electrically connects a source region of the semiconductor film to a data line for supplying an image signal to the pixel electrode, the data line being formed on the second insulating film.

5. The electro-optical device according to claim 4,
wherein the semiconductor films of two switching elements of provided to adjacent pixel electrodes are connected to each other in the source region, and the source region and the data line are electrically connected to each other by one contact hole.

6. An electro-optical device comprising:
a first substrate having a display region where a plurality pixel electrodes and a plurality of switching elements corresponding to the pixels electrodes are formed;
a second substrate disposed so to be opposite to the first substrate;
an electro-optical material interposed between the first and second substrates;
first films a plurality of each of which is formed on the first substrate and has two adjacent edges formed in at least a part of each of the plurality of first films;
a first insulating film that is laminated on the first films;
second films that are laminated on the first insulating film;
a second insulating film that is laminated on the second films; and
contact holes each of which is formed in the second insulating film above the two edges to pass through the second insulating film,
wherein the contact hole is formed at a position apart from the two edges by a distance equal to or larger than the thickness of the first insulating film in plan view,
the plurality of pixel electrodes and the plurality of switching elements are provided on the first substrate, and
the plurality of the first film are composed of a plurality of scanning lines through which signals for turning on or off the plurality of switching elements are supplied and which are provided for the plurality of pixel electrodes.

7. An electro-optical device comprising:
a first substrate having a display region where a plurality pixel electrodes and a plurality of switching elements corresponding to the pixels electrodes are formed;
a second substrate disposed so to be opposite to the first substrate;
an electro-optical material interposed between the first and second substrates;
first films a plurality of each of which is formed on the first substrate and has two adjacent edges formed in at least a part each of the plurality of first films
a first insulating film that is laminated on the first films;
second films that are laminated on the first insulating film;
a second insulating film that is laminated on the second films; and
contact holes each of which is formed in the second insulating film above the two edges to pass through the second insulating film,
wherein the contact hole is disposed to extend over the two adjacent edges in plan view,
the plurality of pixel electrodes and the plurality of switching elements are provided on the first substrate, and
the plurality of first films are composed of a plurality of scanning lines through which signals for turning on or off the plurality of switching elements are supplied and which are provided for the plurality of pixel electrodes.

8. A plurality of conducting and insulating films for electrically connecting a plurality of layers in an electro-optical device, comprising:
a first film having a first end portion;
a second film arranged apart from the first film and having a second end portion opposite to the first end portion;
a first insulating film formed on the first and second films;
a third film whose film thickness is thinner a film thickness of that of the first insulating film formed on the first insulating film and formed over the first and second films in plan view;
a second insulating film formed on the third film; and
a contact hole positioned between the first and second end portions, passing through the second insulating film, and exposing a part of the third film from the second insulating film, in plan view,
the first insulating film having a step portion, corresponding to the first and second films, between the first and second end portions in plan view,
the third film having an inclined surface formed corresponding to the step portion, and
in plan view, the contact hole being formed at a position apart from the first and second end portions at a distance of the film thickness of the first insulating film or more from the first and second end portions.

9. A plurality of conducting and insulating films for electrically connecting a plurality of layers in an electro-optical device, comprising:
a first film having a first end portion;
a second film arranged apart from the first film and having a second end portion opposite to the first end portion;
a first insulating film formed on the first and second films;
a third film whose film thickness is thinner than a film thickness of the first insulating film formed on the first insulating film and formed over the first and second films in plan view;
a second insulating film formed on the third film; and
a contact hole passing through the second insulating film and exposing a part of the third film from the second insulating film,
the first insulating film having a step portion, corresponding to the first and second films, between the first and second end portions in plan view,
the third film having an inclined surface formed corresponding to the step portion, and
the contact hole being arranged over the first and second films in plan view.

10. An electro-optical device, comprising:
a first substrate, a second substrate opposite to the first substrate, and liquid crystal interposed between the first and second substrates; and
on the first substrate, a data line arranged along a first direction, first and second scanning lines arranged along a second direction crossing the first direction, a first switching element formed corresponding to a crossing portion of the data line and the first scanning line, a second switching element formed corresponding to a crossing portion of the data line and the second scanning line, a first insulating film formed on the second substrate side of the first and second scanning lines, and a second insulating film formed on the second substrate side of the first and second switching elements,
the first scanning line having a first portion extending along the second direction and a second portion protruding from the first portion in the direction of the second scanning line along the data line, in plan view, the second scanning line having a third portion extending along the second direction and a fourth portion protruding from the third portion in the direction of the first scanning line along the data line, in plan view, a semiconductor film having a common source region commonly used as a source region of the first switching element and a source region of the second switching element being formed along the data line in a region overlapping the data line in plan view, the semiconductor film being formed over the second and fourth portions in plan view and having a film thickness thinner than a film thickness of the first insulating film, the first insulating film having a step portion, corresponding to the first and second scanning lines, between the second and fourth portions in plan view, the semiconductor film having an inclined surface formed corresponding to the step portion, the data line and the semiconductor film being electrically connected between the second and fourth portions via a contact hole going through the second insulating film, and in plan view, the contact hole being formed at a position at a distance of the film thickness of the first insulating film or more from both a first end portion of the second portion, opposite to the fourth portion, and a second end portion of the fourth portion, opposite to the second portion.

11. An electro-optical device, comprising:

a first substrate, a second substrate opposite to the first substrate, and liquid crystal interposed between the first and second substrates; and on the first substrate, a data line arranged along a first direction, first and second scanning lines arranged along a second direction crossing the first direction, a first switching element formed corresponding to a crossing portion of the data line and the first scanning line, a second switching element formed corresponding to a crossing portion of the data line and the second scanning line, a first insulating film formed on the second substrate side of the first and second scanning lines, and a second insulating film formed on the second substrate side of the first and second switching elements, the first scanning line having a first portion extending along the second direction and a second portion protruding from the first portion in the direction of the second scanning line along the data line, in plan view, the second scanning line having a third portion extending along the second direction and a fourth portion protruding from the third portion in the direction of the first scanning line along the data line, in plan view, a semiconductor film having a common source region commonly used as a source region of the first switching element and a source region of the second switching element being formed along the data line in a region overlapping the data line in plan view, the semiconductor film being formed over the second and fourth portions in plan view and having a film thickness thinner than a film thickness of the first insulating film, the first insulating film having a step portion, corresponding to the first and second scanning lines, between the second and fourth portions in plan view, the semiconductor film having an inclined surface formed corresponding to the step portion, the data line and the semiconductor film being electrically connected via a contact hole going through the second insulating film, and the contact hole being arranged over the second and fourth portions in plan view.

* * * * *